United States Patent
Zhang et al.

(10) Patent No.: US 9,284,769 B2
(45) Date of Patent: Mar. 15, 2016

(54) INTELLIGENT SAFETY DEPOSIT, SAFETY CONTROL SYSTEM AND CONTROL METHOD THEREOF

(71) Applicant: Wei Zhang, Shenzhen, Guangdong (CN)

(72) Inventors: Wei Zhang, Guangdong (CN); Tianye Zhao, Guangdong (CN)

(73) Assignee: Wei Zhang, Shenzhen (CN)

( * ) Notice: Subject to any disclaimer, the term of this patent is extended or adjusted under 35 U.S.C. 154(b) by 0 days.

(21) Appl. No.: 14/770,469

(22) PCT Filed: Aug. 21, 2013

(86) PCT No.: PCT/CN2013/081996
§ 371 (c)(1),
(2) Date: Aug. 26, 2015

(87) PCT Pub. No.: WO2015/024223
PCT Pub. Date: Feb. 26, 2015

(65) Prior Publication Data
US 2016/0010384 A1    Jan. 14, 2016

(51) Int. Cl.
| | |
|---|---|
| G06Q 40/00 | (2012.01) |
| G07D 11/00 | (2006.01) |
| G07F 19/00 | (2006.01) |
| E05G 1/10 | (2006.01) |
| G06K 7/10 | (2006.01) |
| H01Q 1/22 | (2006.01) |
| H01Q 1/36 | (2006.01) |
| E05G 1/00 | (2006.01) |

(52) U.S. Cl.
CPC .............. *E05G 1/10* (2013.01); *G06K 7/10346* (2013.01); *G06K 7/10356* (2013.01); *H01Q 1/2216* (2013.01); *H01Q 1/36* (2013.01); *E05G 1/005* (2013.01)

(58) Field of Classification Search
CPC ........ G06Q 40/00; G07D 11/00; G07F 19/00; G07F 17/00; G06K 19/00
USPC .............................. 235/379, 375, 487; 705/43
See application file for complete search history.

(56) References Cited

U.S. PATENT DOCUMENTS

| | | | | |
|---|---|---|---|---|
| 2008/0302868 A1* | 12/2008 | Nakajima | ............... | G06Q 20/10 235/379 |
| 2014/0144976 A1* | 5/2014 | Angus | ...................... | G07D 7/12 235/375 |

\* cited by examiner

*Primary Examiner* — Edwyn Labaze (57) ABSTRACT

An intelligent safety deposit including a case, a card slot, and an antenna, the card slot is inside the case to receive a folder with a tag thereon, and the tag comprising a RFID antenna and a chip, the reader antenna is set correspondingly to the folder, information recorded in the chip with the tag is read and identified separately via transmitting data between the reader antenna and the RFID antenna. The reader antenna includes a RF connector, RF ground planes, a plurality of antenna traces with unequal widths and a plurality of load impedance, the RF connector is connected with the plurality of antenna traces via buried holes, the plurality of antenna traces with unequal widths are respectively connected with the plurality of load impedance by running through the buried holes, the antenna traces with unequal widths are connected without overlapping, and values of each load impedance are equal.

10 Claims, 9 Drawing Sheets

INTELLIGENT SAFETY DEPOSIT, SAFETY CONTROL SYSTEM AND CONTROL METHOD THEREOF

CROSS-REFERENCE TO RELATED APPLICATION

The application is a U.S. National Stage of PCT application No. PCT/CN2013/081996 filed on Aug. 21, 2013.

BACKGROUND OF THE INVENTION

1. Field of the Invention

The present invention relates to a safety deposit and a system thereof, and more particular, refers to an intelligent safety deposit with an RFID antenna, a safety control system and a control method thereof.

2. Description of Related Art

With the development of information technology, information management related to documents or valuables has gradually been applied and promoted. However, existing document electronic anti-theft systems are limited to radiation range of reader antenna, and cannot be used to read tag information in both near and far range due to poor integration. For the safety deposits contenting files or valuables inside, in the case of UHF RFID solution, it required to set shielding slots such that each item reader can separately read tag information of corresponding article to determine whether the items are kept in the order when it needs to place multiple files or valuables and there are certain requirements for the order. Existing solution applied to distinguish and manage the files and articles in safety deposits is implemented by HF RFID antennas. For HF RFID antennas, energy required by the tags could be obtained by inductive coupling the tag antennas, therefore, the tags could be read only in a limited area, generally, the read range is from 1 cm to 10 cm, so it does not have the long-range anti-theft tracking function since it can not be read remotely, even if its characteristics are advantageous for management of the zones of the files and articles. The working principle of the UHF RFID antennas is based on electromagnetic reflection and scattering, wherein the tags could be read in more remote location, and the read range could reach to 10 cm or more according to maximum power of the standard protocol, therefore, such characteristic could be used in anti-theft scheme. However, the UHF RFID with conventional reader antenna is unable to limit tags read range, and card readers should read all tags in the range covering their antenna radiation range according to the communication protocol, so it should be difficult to use the UHF RFID for small-scale regional distinction management programs, such as file management programs etc.

Some manufacturers propose a solution applying dual frequency at the same time —that is, HF RFID and UHF RFID antennas could be deposited on a same file or article, wherein the HF RFID antenna could be used for the regional distinction management and the UHF RFID antenna for the anti-remote read; however, the solution requires two hardware facilities with different frequencies and different protocols which causes a great cost; furthermore, the HF RFID and UHF RFID antennas might interfere with each other to cause a serious deterioration in the performance of two tags.

Some manufacturers put forward to distinguish and manage document or article by making the shield cavity within the safety deposit, but that increases the manufacture cost and difficulty, and it is very difficult to define the antenna working area range and achieve a desired effect.

Therefore, it is necessary to provide a new intelligent safety deposit, a safety control system and a control method thereof, which could take into account both the file management in closed rang and the anti-remote read, thus to achieve precise management and inventory, and to identify if a file is taken out of the safety deposit or a file is illegally taken out of the security space.

SUMMARY OF THE INVENTION

On account of the lack of the prior art, an object of the present invention is to provide an intelligent safety deposit that can accurately manage and control files in accordance with storage and placing order.

Another object of the present invention is to provide a control system and method that can accurately manage and control files in accordance with storage and placing order and can guard against theft within a certain spatial range.

The present invention provides an intelligent safety deposit, comprising a case, a card slot, and an antenna, wherein the card slot is set inside the case to receive a folder with a tag thereon, and said tag comprises a RFID antenna and a chip, said reader antenna is set correspondingly to the folder, information recorded in said chip with said tag is read and identified separately via transmitting data between said reader antenna and the RFID antenna, the reader antenna comprises a RF connector, RF ground planes, a plurality of antenna traces with unequal widths and a plurality of load impedance, wherein, said RF connector is connected with said plurality of antenna traces via buried holes, said plurality of antenna traces with unequal widths are respectively connected with the plurality of load impedance by running through said buried holes, said antenna traces with unequal widths are connected without overlapping, and value of each load impedance are equal.

Preferably, said reader antenna further comprises a power divider being connected between said RF connector and said antenna traces with unequal widths. Number of said antenna traces set between two ground planes is 2-8, sub-line number is corresponding to the number of said antenna traces.

Preferably, radian curves of said antennas is satisfied to quadratic function equation: $Y=ax^2+bx+c$, wherein X represents abscissa of the arc and Y is Y-axis thereof, the radian curves of each said antenna trace with unequal width are equal. Total length of antenna trace with unequal widths is equal to half a wavelength. The radian obtained by the quadratic function equation results that the width of the antenna traces changes in a gentle manner, thus to effectively avoid the width mutation and to effectively broaden the operating bandwidth of the antennas.

Preferably, values of said load impedance are set in a way that total impedance calculated is equal to 50 ohms, resistance values of the load impedance connected with each antenna trace with unequal widths are equal.

In the intelligent safety deposit, distance between said RFID antenna and said reader antenna is 1-4 cm, and distance between said reader antennas is not less than 4 cm. Each reader antenna reads tag information within an effective range.

The present invention provides a safety control system adopted the intelligent safety deposit, wherein the system comprises a central processor, a single-channel reader and a multi-channel reader connected thereto, said single-channel reader is connected with said high-gain directional antenna, and said multi-channel reader is connected with said each reader antenna inside the safety deposit, tag information are obtained by the high-gain directional antenna and the reader antenna and transmitted to the central processor to make decisions via the single-channel reader and the multi-channel reader.

The safety deposit and the anti-theft system are combined in the safety control system. The anti-theft system are managed and controlled by the central processor. A same tag is read by different antennas to provide different functions. By the improved antenna, it could identify in short range if a file is taken out of the safety deposit or correctly placed, or in long range, if a file is taken out of the anti-theft zone.

The present invention provides a control method adopted the safety control system, wherein the method comprising steps:

Step 1) to activate the multi-channel reader and the safe internal reader antenna, and to open sequentially the reader antenna inside the next safety deposit to read the tags of the next folder if a tag is corresponding to the read information;

Step 2) to open the high-gain directional antenna if none of tag information is read by the current reader antenna; to activate a first level alarm to prompt that folders haven been stolen if tag information is read by the high-gain directional antenna, simultaneously, the system should be reset to resume scanning tags; to reset the reader antenna to read once again if none of tag information is read by the high-gain directional antenna;

Step 3) to activate the alarm deposit to send a second level alarm and prompt that a folder is incorrectly placed once the current reader antenna reads tag information that does not correspond; simultaneously, the next reader antenna should be activated to read the tag of the next folder;

Step 4) to sequentially and cyclically read each tag information;

Wherein, in the steps 3) and 4), the first and second level alarms are independent each other in the whole system scanning process, that is, the alarms could be simultaneously or separately shown.

Compared with the prior art, the intelligent safety deposit, the safety control system and control method of the present invention have the following advantages:

(1) By the improved UHF RFID antenna in the intelligent safety deposit, the data could be transferred in short range, each reader antennas, RFID antenna and tag correspond one by one, the reader antenna reads the corresponding RFID antenna to decide if the folder is correctly placed;

(2) The radiation range of the reader antenna could be effectively defined by the improved reader antenna in the intelligent safety deposit, the power divider and the antenna traces with unequal widths are connected with the load impedance, its radiation field decays rapidly with distance from the reader antenna. The tag information could be read in a certain read range by the definition of the improved reader antenna, thus to eliminate the shielding case setting for each folder and avoid misreading phenomenon occurred between adjacent readers;

(3) The data could be read by the reader in short range by the UHF RFID built in the tag and by the characteristics of the antenna. Simultaneously, the data could be read by the high-gain directional antenna in long distance. By this way, the files inside the safety deposit could be accurately managed and thus to provide the function of anti-theft within a certain range;

(4) The safety control system provides the anti-theft system in the short and long distances for the safety deposit to manage the files and guard against theft at the same time, and the different alarm forms according to different situations could timely report the current situation of the files. Therefore, if a file is stolen, it can take timely remedial measures;

(5) The safety control method combines the control of managing files and anti-theft in long distance. The tag information is read in a certain order to decide if the files are correctly placed. In the case that none of tag information is obtained by the reader, which proves none of folder is inside the slot, then to activate the anti-theft system of the high-gain directional antenna to decide the zone of the tag, thus to avoid losing any folders.

DESCRIPTION OF THE PREFERRED EMBODIMENTS

Figure 1:
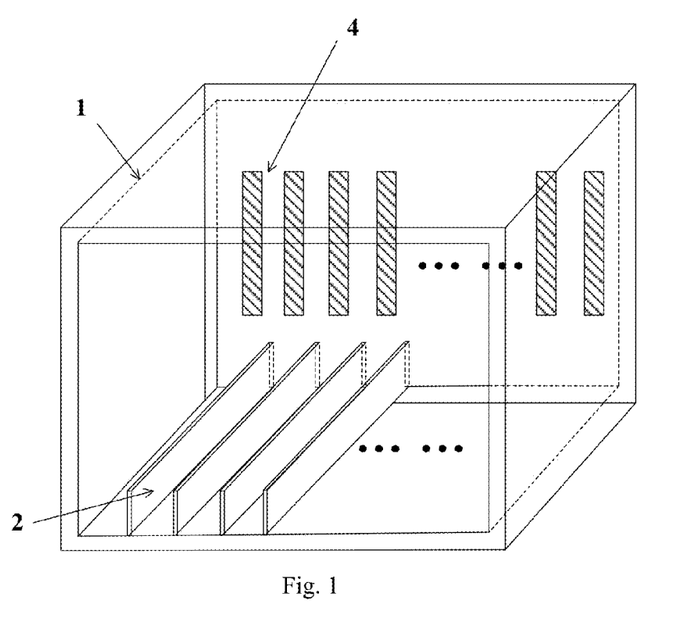
FIG. 1 is a schematic structural diagram of an intelligent safety deposit of the invention.
Figure 2:
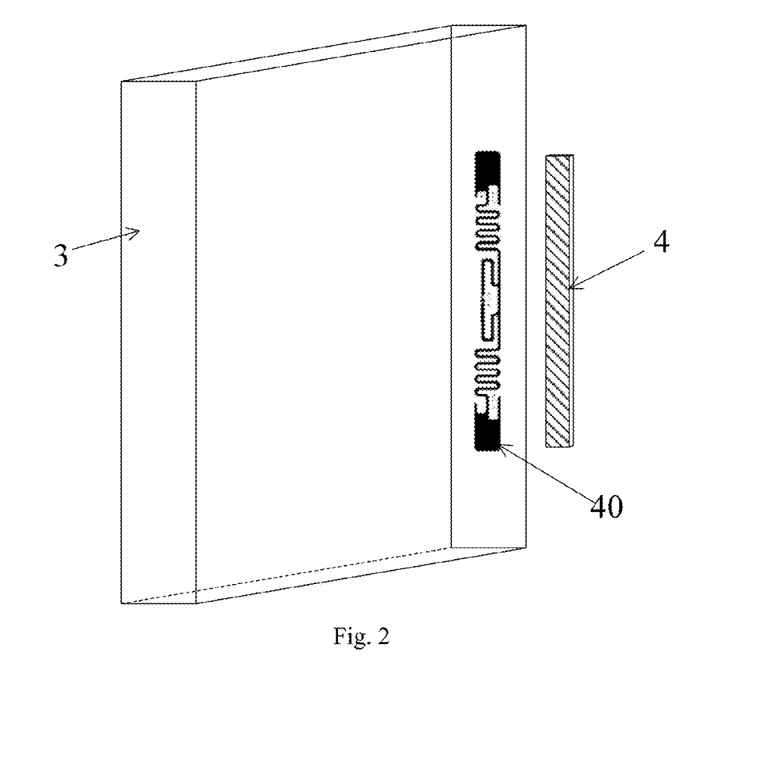
FIG. 2 is an assembling schematic diagram of a single folder and a reader antenna of an intelligent safety deposit of the invention.
Figure 3:
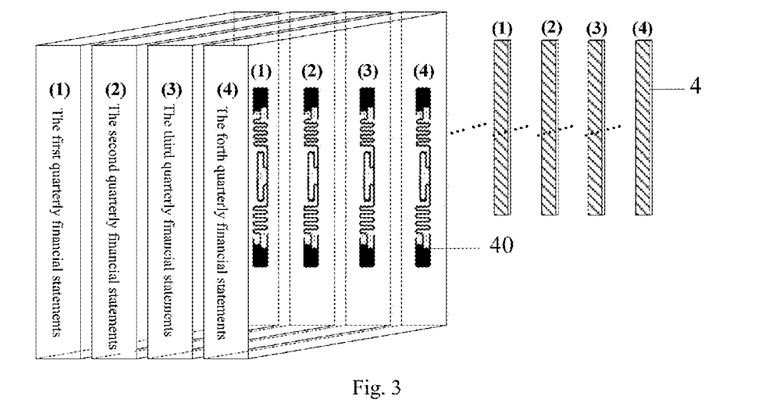
FIG. 3 is an assembling schematic diagram of multiple folders and multiple reader antennas of an intelligent safety deposit of the invention.

Referring to FIGS. 1-3, an intelligent safety deposit, a safety control system and a control method thereof are provided to properly accommodate a variety of important articles or documents and avoid to be stolen or misplaced, so as to assure the security. By the present invention, tag-reading scope could be accurately defined. Moreover, the present invention permits to precisely manage the documents within the safety deposit, guard against theft at long-distance, establish an unified and diversified wireless security system, and combine the close and long distance anti-theft setting, therefore, the storage security and accuracy of the articles or documents could be greatly improved. The intelligent safety deposit, the safety control system and the control method according to the present invention will be successively introduced hereinafter.

The present invention provides an intelligent safety deposit 100 including a case 1, a card reader slot 2, and an antenna 4. Wherein, the card reader slot 2 is set inside the case 1 to receive a folder 3 with a tag 40 thereon, and the tag 40 includes a RFID antenna 42 and a chip (not shown). The reader antenna 4 is set correspondingly to the folder 3. Information recorded in the chip with the tag 40 could be read and identified separately via transmitting data between the reader antenna 4 and the RFID antenna 42. Wherein, the case 1 could be used for storing the items or documents to be kept, in the present embodiment, storing folders for example. A number group of built-in card slots 2 arranged parallel to one another are set inside the case 1, the width of the slot 2 is slightly wider than the thickness of the folder 3 to ensure that the folder 3 be pushed along the slot 2 into the case 1 and the tag on its back is just in face to the reader antenna 4 and without a larger distance deviation, and to guarantee that the distance between the tag 40 and the reader antenna 4 should be fixed, and in the present invention, 1-4 cm for example, every time when it extends into the case 1 along the slot 2. The slot 2 is not necessary to be set too high due to it is only used to space each folder 3 to put them in line. The back side of each folder 3 has a tag 40 embodied with a chip and RFID antenna 42, and the chip contains the relevant information of the corresponding folder such as a folder name, responsible, specific content, etc. to identify the content of the files. The RFID antenna 42 transmits the information about the corresponding tag 40 to the relative reader antenna 4 to read and identify, the folder 3 is set correctly in the corresponding slot 2 if both of them are matched; or, the folder 3 is set incorrectly in the corresponding slot 2 if both of them aren't matched; and if there has no signal or data to be read, that is, none of folder 3 is set in the slot 2. Each folder 3 is deposited in each corresponding slot 2 and has a corresponding tag 40, a RFID antenna 42 is built in each tag 40 and corresponds to a reader antenna 4, each RFID antenna 42 could be read by each corresponding reader antenna 4 to transmit property information in the corresponding tag to the reader antenna 4 to identify and decide, thus to avoid misreading or misplacement. In this embodiment, the folder 3 could relate to financial statements, wherein the first quarterly financial statements could be placed in the 1st slot and corresponds to the 1st reader antenna; the second quarterly financial statements could be placed in the 2nd slot and corresponds to the 2nd reader antenna . . . In the present invention, the RFID antenna could be preferably UHF RFID antenna and its frequency range is 860 MHz-960 MHz.

For the intelligent safety deposit of the present invention, the distance between the RFID antenna 42 and the card reader 4 is 1-4 cm, and the distance between said card readers is bigger or equal to 4 cm, that is, the read range of the RFID antenna 42 is 4 cm in wide and 4 cm in height, and the back of the reader antenna 4 cannot be effectively read. Signal of adjacent RFID antennas 42 could be transmitted without interference by limiting the effective reading range of the RFID antennas 42, thus to eliminate the need of shield setting, simplify the cabinet structure, and improve the accuracy of the signal data transmission.

Figure 4A:
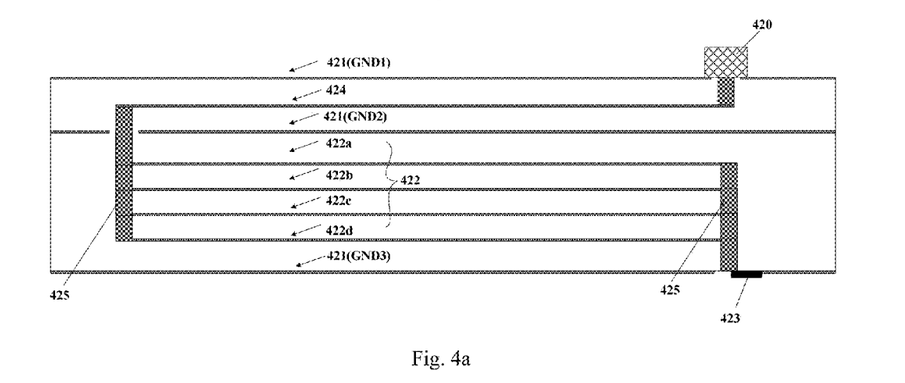
FIG. 4a is a schematic diagram of an input buried hole of the reader antenna of an intelligent safety deposit of the invention.
Figure 4B:
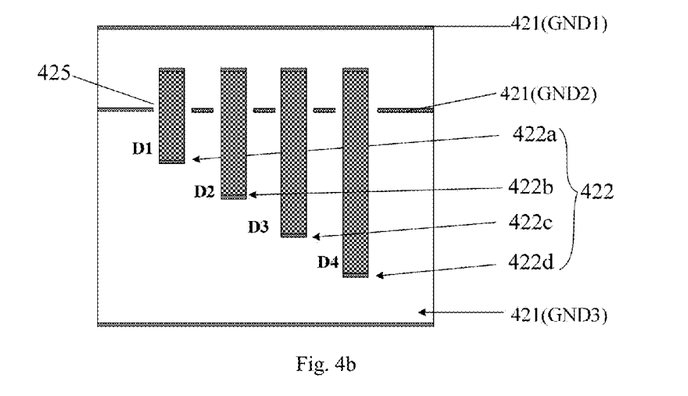
FIG. 4b is a schematic diagram of an output buried hole of the reader antenna of an intelligent safety deposit of the invention.
Figure 4C:
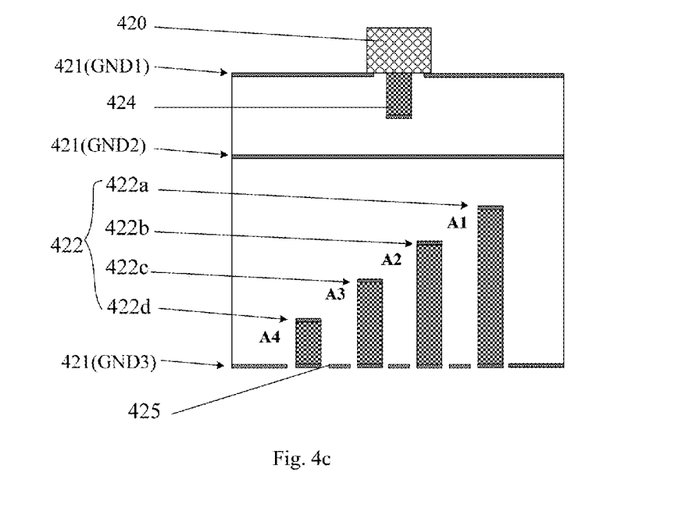
FIG. 4c is a lateral view of the buried hole of the reader antenna of an intelligent safety deposit of the invention.

Hereinafter, the specific structure of the reader antenna 4 will be further described. Referring to FIG. 4a, the reader antenna 4 includes a RF connector 420 setting on the antenna plate, RF ground planes 421, a plurality of antenna traces 422 with unequal widths and a plurality of load impedance 423. Wherein, the RF connector 420 is connected with the plurality of antenna traces 422 by power dividers 424 running through the buried holes 425, the plurality of antenna traces 422 with unequal widths are respectively connected with the plurality of load impedance 423 by running through the buried holes 425, the antenna traces 422 with unequal widths are connected without overlapping, and values of each load impedance 423 are equal. From top to bottom on the cross-section illustrating the antenna, the first layer is the RF ground plane 421, and outer edge of the RF connector 420 shares a common ground with the RF ground plane 421, a center signal cable of the RF head is connected with the buried hole 425 and the antenna traces 422 with unequal widths. Wherein, the antenna traces 422 with unequal widths are connected without overlapping. Referring to FIGS. 4b-4c, each antenna trace 422 with unequal widths runs through respectively the buried holes D1, D2, D3 and D4 being spaced from each other, and after a parallel cabling, runs through respectively another group of buried holes A1, A2, A3 and A4, and then to connect respectively with the load impedance 423, wherein, lengths of the antenna traces 422 with unequal widths are equal.

Figure 4D:
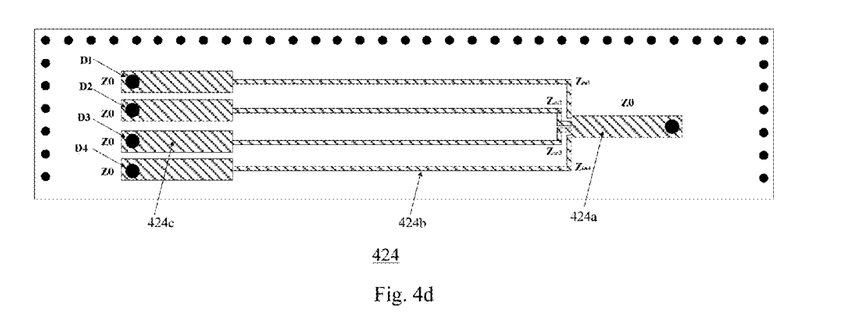
FIG. 4d is a schematic diagram of a second layer PCB power splitter of the reader antenna of an intelligent safety deposit of the invention.
Figure 4E:
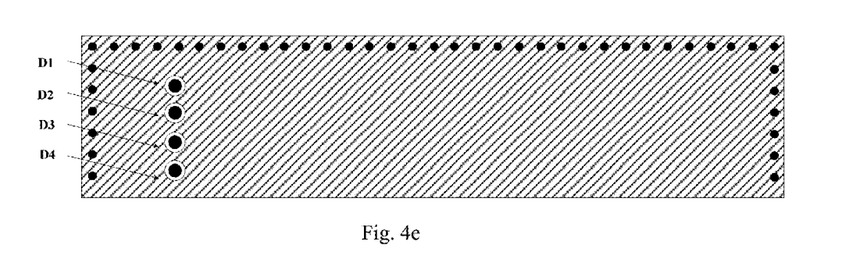
FIG. 4e is a schematic diagram of a third GND2 of the PCB of the reader antenna of an intelligent safety deposit of the invention.

Referring to FIG. 4d, in a preferred embodiment of the present invention, the reader antenna 4 is further provided with a power divider 424 connected between the RF connector 420 and the antenna traces 422 with unequal widths. The power divider 424 is lead out by the RF connector 420 and connects with each antenna trace 422 with unequal widths to divider input signals of the RF connector 420 into multiple and then to output, sub-line number of the power divider 424 is equal to that of the antenna traces 422.

In this embodiment, for a sub-four power divider as an example, wherein there are four antenna traces 422 with unequal widths, outputs of the sub-four power divider are connected respectively with four antenna traces 422 with unequal widths. In the present invention, number of the antenna traces 422 set between two RF ground planes 421 is optionally comprised between 2 and 8. In this embodiment, from top to bottom, the first layer is a RF ground plane GND1, the second layer is an alignment layer of the sub-four power divider 424, the third layer is RF ground plane GND2, and the antenna traces 422 are deposited on the layers form the forth to the seventh, wherein, 422a indicates the forth layer, 422b indicates the fifth layer, 422c indicates the sixth layer, 422d indicates the seventh layer; and a RF ground plane GND 3 is set on the eighth layer. An outer edge of the RF connector 420 shares a common ground with the RF ground plane GND1, a center signal cable of the RF head is connected with the buried hole 425 and the antenna traces 422 with unequal widths by the power divider 424, wherein, the antenna traces 422 with unequal widths are connected without overlapping, and resistance values of the load impedance 423 connected with the antenna traces 422 with unequal widths are equal, the resistance values setting requirements of the load impedance will be explained hereinafter. Referring to FIG. 4d, an input bus 424a of the sub-four power divider is connected with the RF connector via a buried hole on the right side, the input bus is divided on four group of outputs 424b by a four-wire and connected respectively with the corresponding antenna traces 422 with unequal widths. Characteristic impedance Z0 of the bus is 50 ohms, and its width is expressed by Ka, its bus length is 1/8 of the operating wavelength. Characteristic impedance of the four-wire is expressed by Zd, and its width is Kd, its bus length is 1/4 of the operating wavelength. Characteristic impedance of output trace 424c of each power divider is expressed by Z0, and its width is expressed by Ka, its bus length is 1/8 of the operating wavelength.

According to the matching principle: the total input impedance of the power divider should be equal to the resistance value of shunt resistances of each input impedance, that is: Z0=Zin1∥Zin2∥Zin3∥Zin4=50 ohms. Each end of the input impedance is four times the total input impedance due to the power divider is the quarter power divider, which is: $Z_{in1}=Z_{in2}=Z_{in3}=Z_{in4}=4Z_0=200\Omega$; wherein $Z_{in1}, Z_{in2}, Z_{in3}, Z_4$ respectively match with each terminal load impedance $Z_{a0}$ via a quarter-wavelength impedance conversion line, and according to the formula of the quarter-wavelength impedance conversion line:

$Z_{in1}*Z_{a01}=(Z_d)^2, Z_{in2}*Z_{a02}=(Z_d)^2, Z_{in3}*Z_{a03}=(Z_d)^2,$
$Z_{in4}*Z_{a04}=(Z_d)^2$, wherein $Z_{a01}=Z_{a02}=Z_{a03}=Z_{a04}=50\Omega$, so the characteristic impedence of the four-wire is:

$Z_d=\sqrt{Z_{in1}*Z_{a01}}=\sqrt{Z_{in2}*Z_{a02}}=\sqrt{Z_{in3}*Z_{a03}}=\sqrt{Z_{in4}*Z_{a04}}=$
$\sqrt{200*50\Omega}=100\Omega$ According to the calculation formula based on the characteristic impedance of the stripline:

$$Z = \frac{60}{\sqrt{E_r}} \ln\left[\frac{4H}{0.67\pi(T+0.8W)}\right],$$

wherein, H represents height between the RF ground plane GND1 and the RF ground plane GND2, T represents thickness, W represents trace width; the corresponding trace width W could be calculated according to the different characteristic impedance values if the PCB height H, the trace thickness T and PCB dielectric constant $E_r$ are defined. According to the formula, the PCB height H could be defined as 2.0 mm, the trace thickness T could be defined as 0.035 mm, and the dielectric constant $E_r$ could be defined as 4.5 m, so the trace width Ka of the characteristic impedance $Z_0=50\Omega$ of the bus could be calculated, which is equal to about 0.8 mm, the trace width Kd of the characteristic impedance of the four lines equally divided is equal to about 0.1 mm.

The ends of the power divider are respectively connected with the antenna trace 422a (the forth layer of PCB), the antenna trace 422b (the fifth layer of PCB), the antenna trace 422c (the sixth layer of PCB), the antenna trace 422d (the seventh layer of PCB) via the buried holes D1, D2, D3, D4; Each terminus of the antenna trace layers is respectively connected with the load impedance 432 at the PCB bottom via the buried holes A1, A2, A3, A4, all the resistance value of each load impedance is expressed as $Z_L=200\Omega$, which makes that the calculated overall antenna impedance is 50 ohms.

Figure 5A:
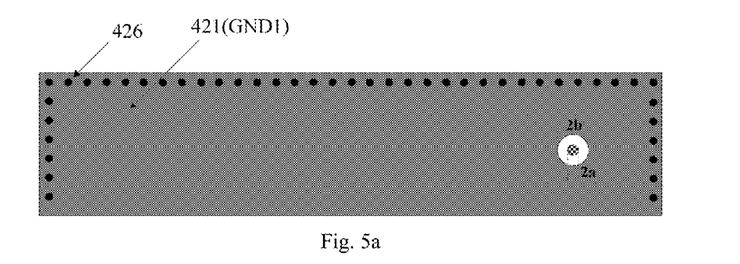
FIG. 5a is a schematic diagram of a first GND1 of the PCB of the reader antenna of an intelligent safety deposit of the invention.
Figure 5B:
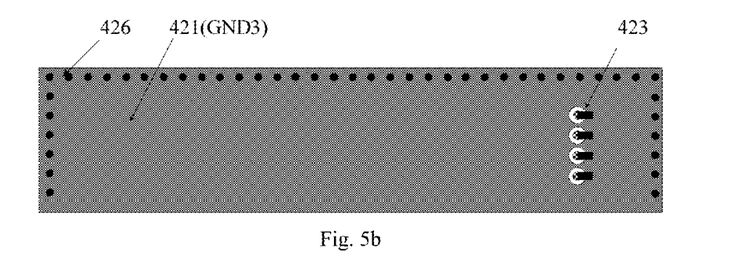
FIG. 5b is a schematic diagram of a eighth GND3 of the PCB of the reader antenna of an intelligent safety deposit of the invention.
Figure 6A:
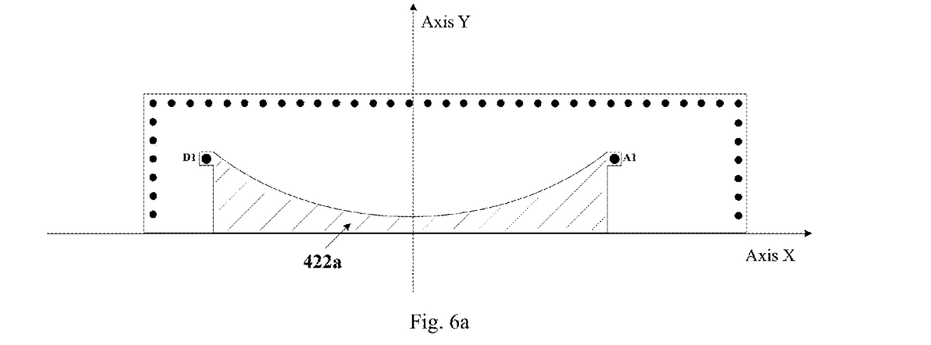
FIG. 6a is a schematic diagram of a fourth layer PCB antenna alignment 1 of the reader antenna of an intelligent safety deposit of the invention.
Figure 6B:
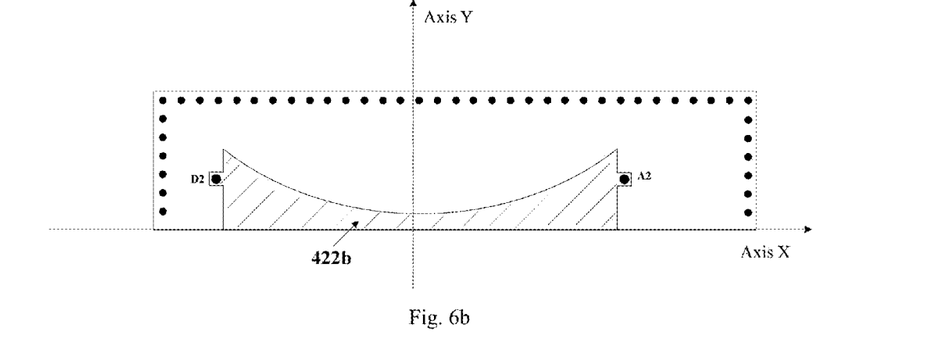
FIG. 6b is a schematic diagram of a fifth layer PCB antenna alignment 2 of the reader antenna of an intelligent safety deposit of the invention.
Figure 6C:
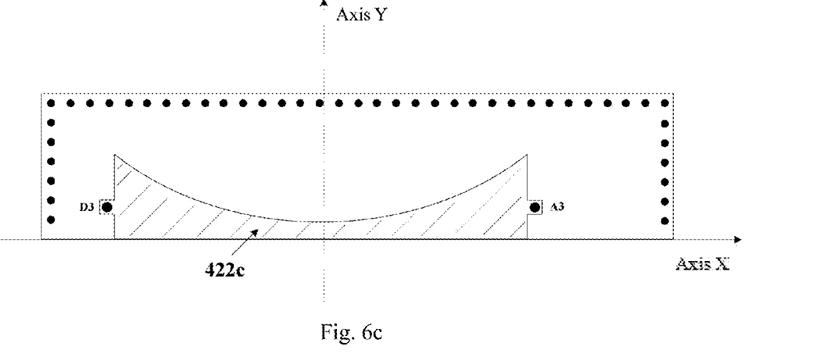
FIG. 6c is a schematic diagram of a sixth layer PCB antenna alignment 3 of the reader antenna of an intelligent safety deposit of the invention.
Figure 6D:
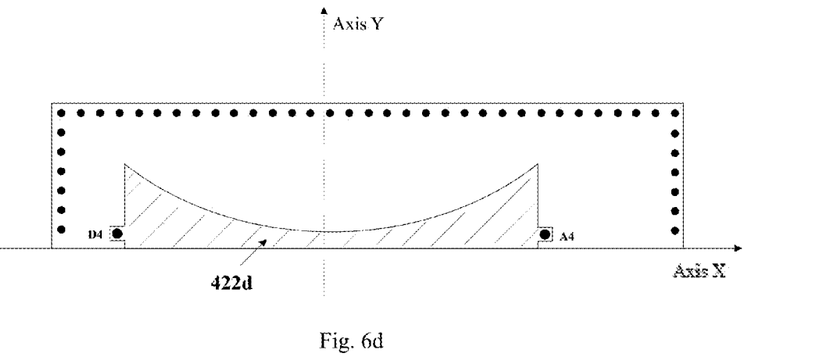
FIG. 6d is a schematic diagram of a seventh layer PCB antenna alignment 4 of the reader antenna of an intelligent safety deposit of the invention.

Referring to FIGS. 5a and 5b, the FIG. 5a is a top plan view of the antenna top layer, and the FIG. 5b is a bottom view of the antenna bottom layer. A plurality of through-hole 426 are disposed at an outer edge of the antenna plate and throughout the entire antenna plate to connect with the RF ground plane 421 and not to electrically connect with the other antenna traces 422 with unequal widths. The size of the buried holes size at the access port of the RF connector 420 is represented by a, peripheral clearance dimensions is represented by b, its size is determined by the following theoretical formula: the formula of the wire capacitance per unit length is:

$$C = \frac{2\pi\varepsilon}{\ln(b/a)},$$

wherein $\varepsilon$ is dielectric constant; inductance per unit length is calculated as:

$$L = \frac{\mu}{2\pi}\ln\frac{b}{a},$$

the formula according to the characteristic impedance:

$$Z_0 = \sqrt{\frac{L}{C}} = \sqrt{\frac{\frac{\mu}{2\pi}\ln\frac{b}{a}}{\frac{2\pi\varepsilon}{\ln(b/a)}}} = \frac{1}{2\pi}\sqrt{\frac{\mu}{\varepsilon}}\ln\frac{b}{a},$$

wherein a=0.6 mm, b=2.6 mm.

In the present invention, as shown in FIGS. 6a-6d, the radian curve of the antenna could satisfy with the following quadratic function equation: Y=ax2+bx+c, the antenna traces are symmetrical, wherein the lower edge of the antenna is defined as axis X, the center vertical line is defined as axis Y, that is X is abscissa of the arc and Y is Y-axis of the arc. In one embodiment of the present invention, if a=0.01, b=0, c=2, then the curve satisfies the equation Y=0.01x2+2, so the narrowest width of the antenna center line is 2 mm, the widest width of both ends is 11 mm, the traces length is about half wavelength, 60 mm. The curve radian of the antenna traces with unequal width is the same, the horizontal heights of adjacent buried holes between different antenna traces successively reduce, thus to effectively prevent short circuit between the buried holes and other PCB layers.

Figure 7:
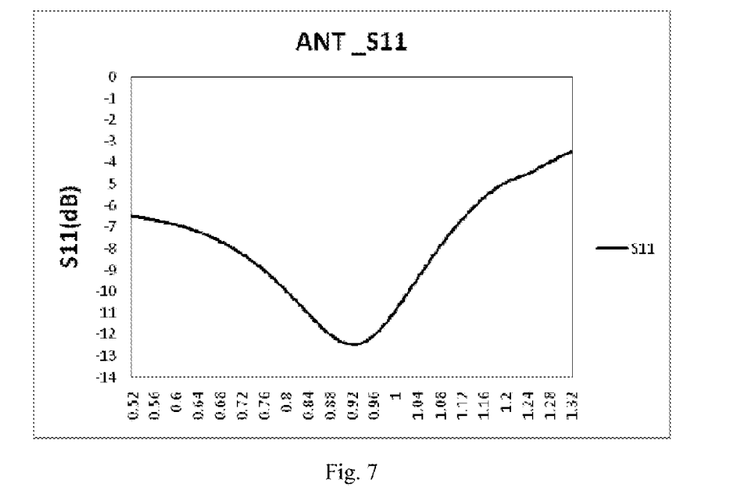
FIG. 7 is a relationship schematic diagram of the reflection coefficient S11 and the operating frequency of the reader antenna of an intelligent safety deposit of the invention.
Figures 8, 9A:
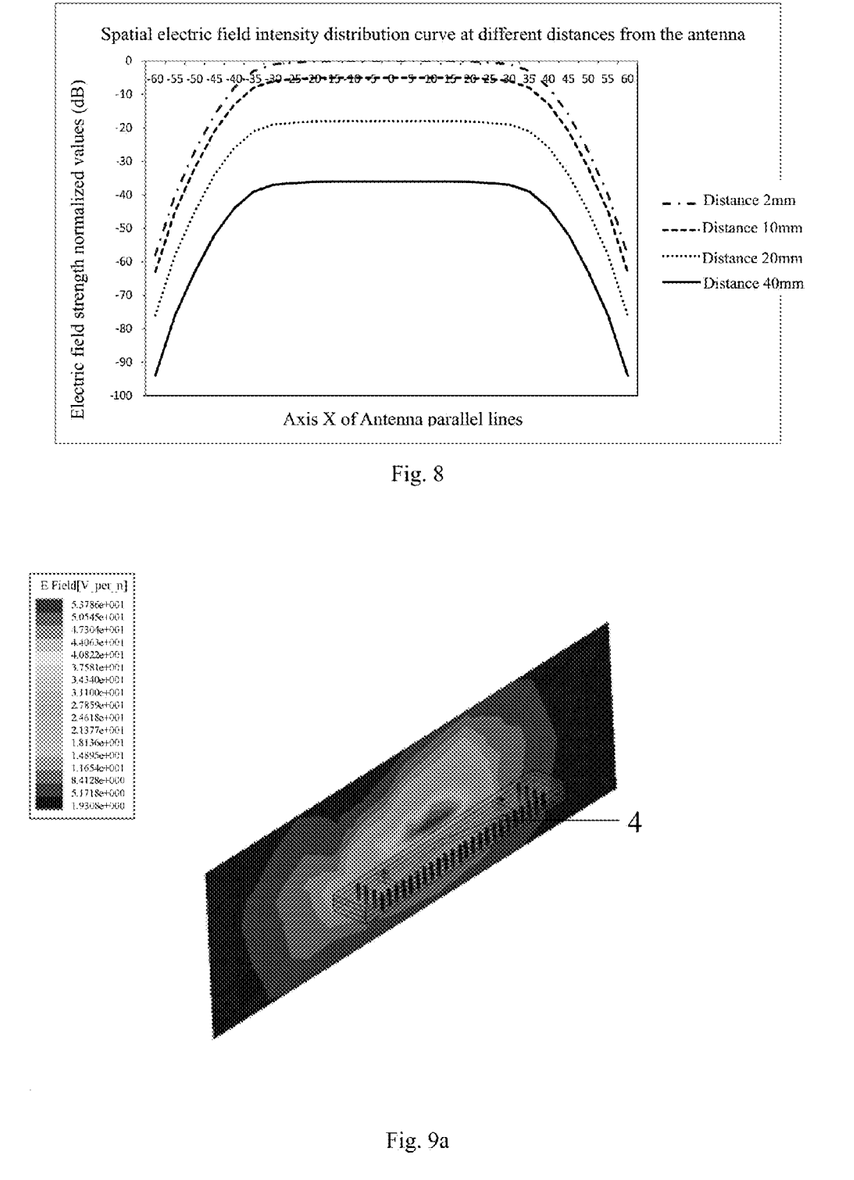
FIG. 8 is a distribution diagram of the electric field intensity at different distances of space of the reader antenna of an intelligent safety deposit of the invention.
FIG. 9a is a first distribution effect diagram of the electric field intensity of parallel planes of the antenna space of the reader antenna of an intelligent safety deposit of the invention.
Figure 9B:
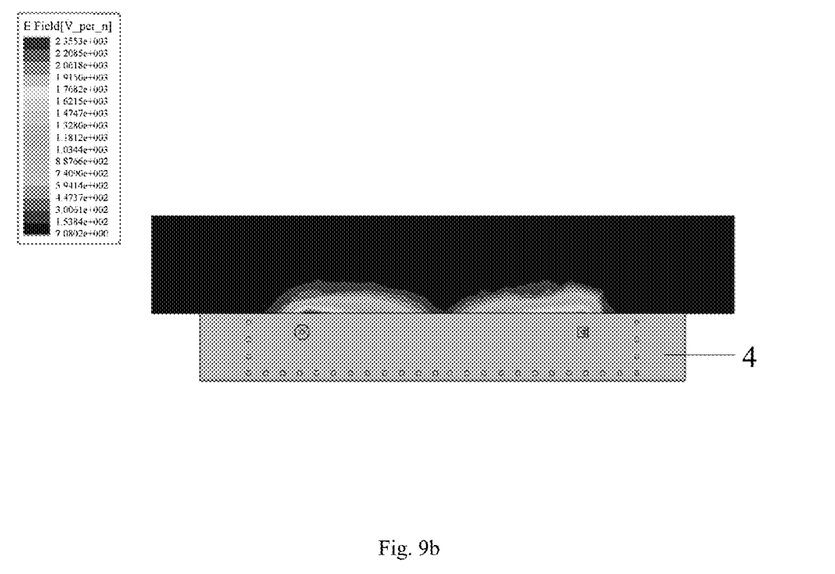
FIG. 9b is a second distribution effect diagram of the electric field intensity of parallel planes of the antenna space of the reader antenna of an intelligent safety deposit of the invention.

Referring to FIG. 7, in the reader antenna operating frequency range, when the reflection coefficient is less than 12 dB, the reader antenna has little reflection loss. This shows that the antenna has good impedance matching. Referring to FIG. 8, which shows the spatial electric field intensity distribution curve at different distances from the antenna, the spatial distribution of the electric field intensity could be calculated by parallel curves at different distances from the antenna, the electric field strength in the antenna center, ±40 mm, is the strongest, and the electric field strength within the range of about 8 cm is relatively strong, and decays rapidly at the antenna edge outside 8 cm; the electric field strength decays rapidly from 2 mm to 40 mm as the distance between the antenna and the parallel lines farther, there is nearly the attenuation of 38 dB at the central location; the antenna energy is concentrated within the scope of the cube of length 8 cm, width 4 cm, and distance 0-40 mm. FIGS. 9a-9b shows the distribution of electric field intensity of the antenna space section, on the left of the figure, different colors represent different values of the electric field intensity, the deeper the color, the surface electric field strength value should be weaker. The antenna energy is concentrated within the scope of the cube: 8 cm in length, 4 cm in width of the antenna space section; so as to define tags that can only be read within the effective range of the plane.

Figure 10A:
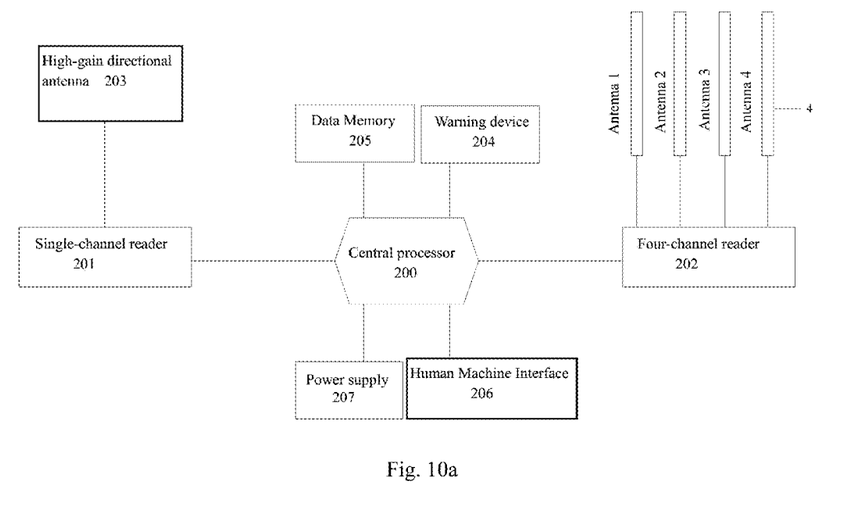
FIG. 10a is a system diagram of an intelligent safety control system of the invention.
Figure 10B:
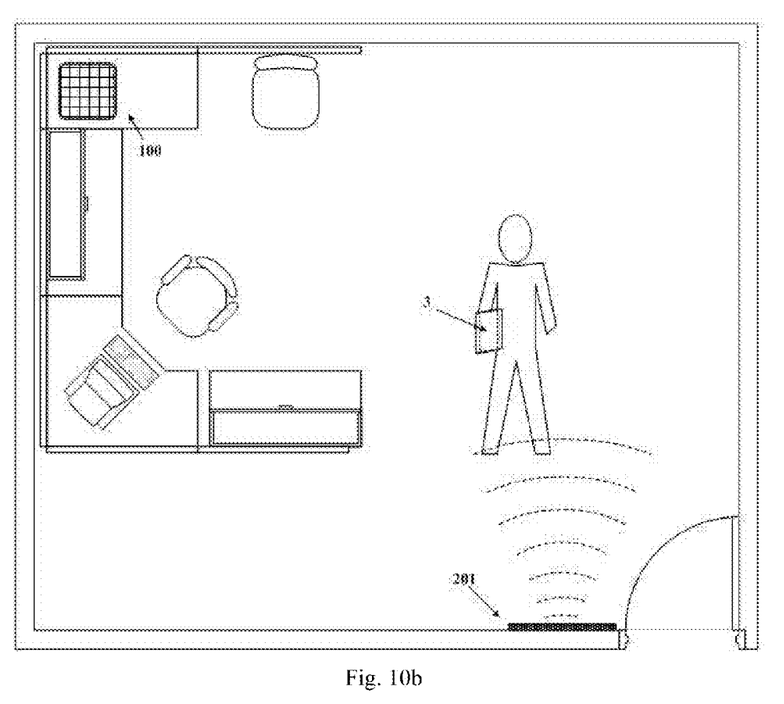
FIG. 10b is a first space schematic diagram of an intelligent safety control system of the invention.
Figure 10C:
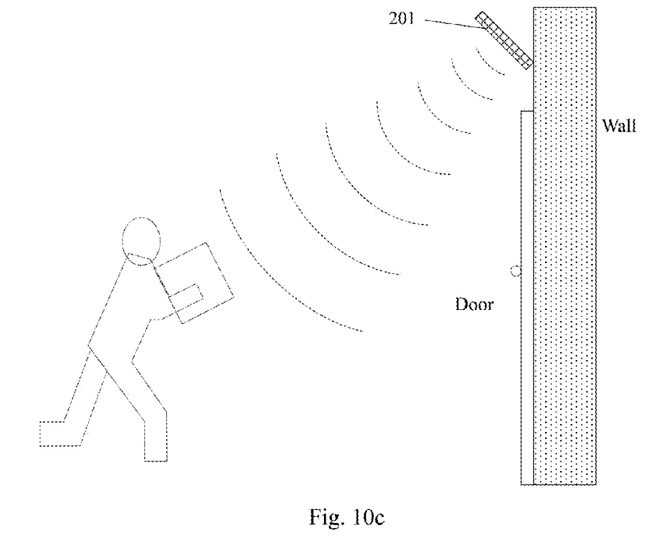
FIG. 10c is a second space schematic diagram of an intelligent safety control system of the invention.

Referring to FIGS. 10a-10c, the present invention also provides a safety control system of an intelligent safety deposit used for anti-theft within a certain spatial range and includes a central processing unit 200 and a single-channel reader 201 and a multi-channel reader 202 connected therewith, the single-channel reader 201 is connected with a high-gain directional antenna 203, the multi-channel reader 202 is connected with each reader antenna 4 within the intelligent safety deposit, and transmits respectively the tags information obtained by the high-gain directional antenna 203 and the reader antennas 4 to the central processing unit 200 via the single-channel reader 201 and the multi-channel reader 202 to make a determination. In this embodiment, the high-gain directional antenna 203 is mounted on the main door, its beam points to the area where staff must pass trough, and its beam is directional and has high gain, thus to read remotely the UHF RFID antenna to effectively prevent leakage reading; the single-channel reader 201 is electrically connected with the high-gain directional antenna 203 and mounted near the entrance to read the distance signal fed by the high-gain directional antenna and transmit it to central processing unit 200 to analyze. Wherein, the multi-channel reader 202 is a four-channel reader and connected respectively with four sets of reader antenna, it is mounted inside the safety deposit to read the signal fed by the reader antennas 4, the reader antennas is mounted on the intelligent safety deposit and correspond to the RFID antennas on the tags of each files to read the tag information transmitted by the RFID antennas, and then transmits the information to the central processing unit via the four-channel reader to make a determination.

In the preferred embodiment of the present invention, the safety control system further includes a warning device 204 electrically connected with the central processing unit 200 to prompt the current situation by the signal transmitted by the single-channel reader 201 and the multi-channel reader 202. The high-gain directional antenna 203 will feed the tag information to the central processing unit 200 by the single-channel reader 201 when it reads the tag information, and then to transmit the alarm signal to the warning device 204 after internal logic judgment to drive it deliver a first level alarm, that represents the folder is carrying out of the anti-theft range.

For the signals obtained by the multi-channel reader 202, they should be fed to the central processing unit 200 if the reader antenna is not match with the RFID antenna of the tags. Then an alarm signal would be sent to the warning device 204 after internal logic determination to drive it send an alarm to prompt that the folder is not correctly placed. The current state of the folder would be sent to related personnel by different alarm forms to prompt that the folder should be replaced, thus to assure the security of the folder.

In a preferred embodiment of the present invention, the safety control system might further include a data memory 205 electrically connected with the central processor 200 to save in real time the tag information read by the different reader antennas and the high-gain directional antennas and to read the time, related personnel could withdrawn at any time the information to analyze and to be informed the moment when the folder was taken out of the anti-theft space.

In a preferred embodiment of the present invention, the safety control system might further include a human machine interface 206 electrically connected with the central processor 200, related personnel could monitor and set the status of the entire system by the human machine interface.

In a preferred embodiment of the present invention, the safety control system might further include a power supply 207 electrically connected with the central processor 200. The power supply contains a battery, and under normal power supply situation, it could supply the system and charge the battery at the same time, and the battery could continue to supply power for the system while it is cut off.

Figure 11:
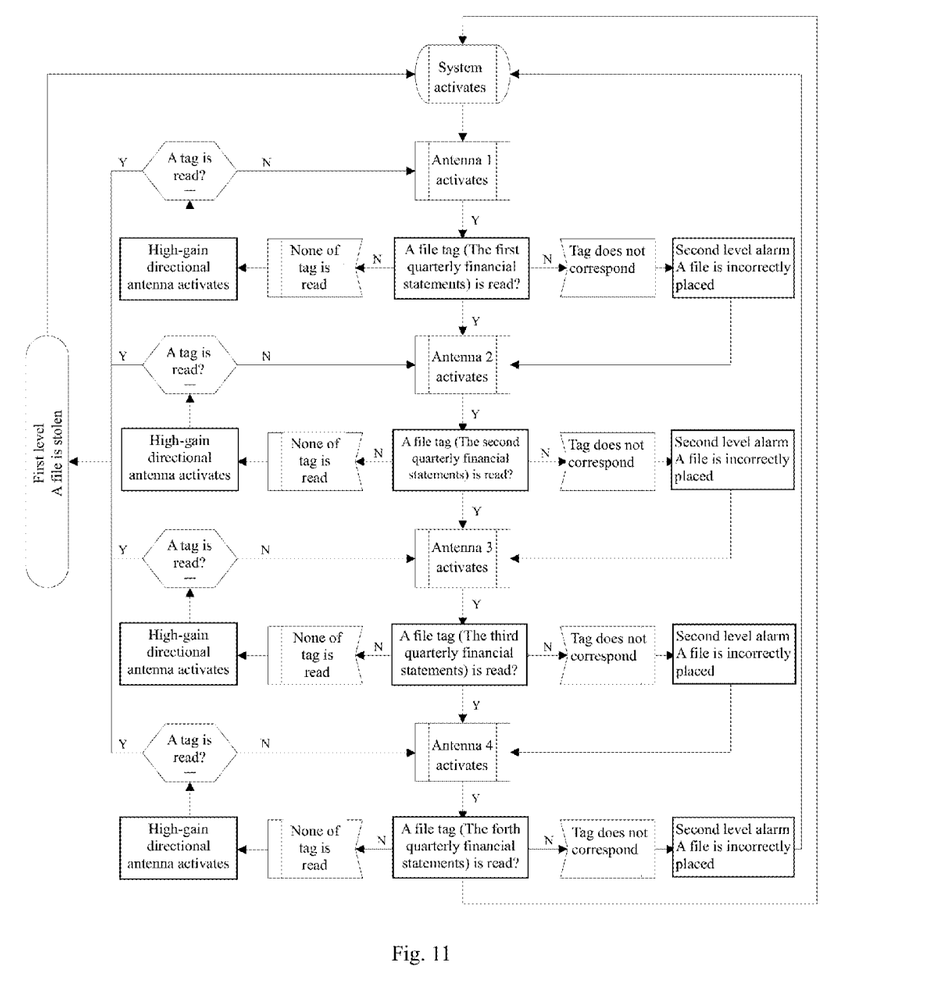
FIG. 11 is a flowchart of an intelligent safety control method of the invention.

Referring to FIG. 11, the present invention also provides a controlling method of the safety control system, which includes the following steps:

Step1) to activate the multi-channel reader and the safe internal reader antenna, and to open sequentially the reader antenna inside the next safety deposit to read the tags of the next folder if a tag corresponding to the information is read;

Step2) to open the high-gain directional antenna if none of tag information is read by the current reader antenna; to activate a first level alarm to prompt that folders haven been stolen if tag information is read by the high-gain directional antenna, simultaneously, the system should be reset to resume scanning tags; to reset the reader antenna to read once again if none of tag information is read by the high-gain directional antenna;

Step3) to activate the alarm deposit to send a second level alarm to prompt that a folder is not placed correctly once the current reader antenna reads tag information that does not correspond; simultaneously, the next reader antenna should be activated to read the tag of the next folder;

Step4) to sequentially and cyclically read each tag information.

Wherein, in the steps 3) and 4), the first and second level alarms are independent each other in the whole system scanning process, that is, the alarms could be simultaneously or separately shown.

In the steps 1), the reader antenna and the multi-channel reader are firstly activated to read sequentially tags of folders, the current folder is placed in a correct position when the folder tag in the first slot correspondingly matches with a corresponding first reader antenna. Then to activate the next reader antenna, the current folder is placed in a correct position when the folder tag in the second slot correspondingly matches with a corresponding second reader antenna. Then to continue sequentially read other folder tags. In the present invention, reading cycle of single reader antenna could be defined as 200 ms. In this embodiment, folder tags of four financial statements need to be sequentially read by sequentially activating the reader antennas, wherein each tag records each folder identifying information, thus to decide if the current folder is placed correctly by reading each tag; by this way, the reader antennas could be sequentially read according to the reading result of the previous reader antenna, thus to avoid signal interference between the adjacent reader antennas and to timely feedback the decision of each folder so that people should get to know placement situations of each folder.

In the steps 2), the high-gain directional antenna is activated if none of the tag information is read by any reader antenna in the safety deposit, or, the tag information is feedback to the central processor via the single-channel reader once it is read by the high-gain directional antenna, then the central processor will send the first level alarm signal to alert devices to executive a first level alarm, this indicates that a folder with readable tags passing through and leaving the radiation range is scanned by the high-gain directional antenna, namely, the current folder is illegally removed from the anti-theft area, so the first level must be activated to alert people to promptly take appropriate measures to stop or remedy; the reader antenna should be reset to read once again if none of the tag information is read by any reader antenna; in the present invention, the cycle of reading tags of the high-gain directional antenna might be defined as 600 ms.

In the steps 3), the tag information is feedback to the central processor via the multi-channel reader to activate the alarm deposit to send a second level alarm to prompt that a folder is not placed correctly once the reader antenna inside the current safety deposit reads a tag information that does not correspond; simultaneously, the next reader antenna should be activated to read the tag of the next folder.

In the system scanning process, the first and second alarm are independent each other, the first alarm prompting that a folder has been stolen and the second alarm prompting that a folder inside the safety deposit is misplaced could be simultaneously or separately executed.

In the steps 4), to read sequentially and cyclically each tag information to surveillance in real time the folders to anti-theft.

The intelligent safety deposit and the safety control system and method of the present invention has the following advantages:

(1) By the improved UHF RFID antenna in the intelligent safety deposit, the data could be transferred in short range, each reader antennas, RFID antenna and tag correspond one by one, the reader antenna reads the corresponding RFID antenna to decide if the folder is correctly placed;

(2) The radiation range of the reader antenna could be effectively defined by the improved reader antenna in the intelligent safety deposit, the power divider and the antenna traces with unequal widths are connected with the load impedance, its radiation field decays rapidly with distance from the reader antenna. The tag information could be read in a certain read range by the definition of the improved reader antenna, thus to eliminate the shielding case setting for each folder and avoid misreading phenomenon occurred between adjacent readers;

(3) The data could be read by the reader in short range by the UHF RFID built in the tag and by the characteristics of the antenna. Simultaneously, the data could be read by the high-gain directional antenna in long distance. By this way, the files inside the safety deposit could be accurately managed and thus to provide the function of anti-theft within a certain range;

(4) The safety control system provides the anti-theft system in the short and long distances for the safety deposit to manage the files and guard against theft at the same time, and the different alarm forms according to different situations could timely report the current situation of the files. Therefore, if a file is stolen, it can take timely remedial measures;

(5) The safety control method combines the control of managing files and anti-theft in long distance. The tag information is read in a certain order to decide if the files are correctly placed. In the case that none of tag information is obtained by the reader, which proves none of folder is inside the slot, then to activate the anti-theft system of the high-gain directional antenna to decide the zone of the tag, thus to avoid losing any folders.

What is claimed is:

1. An intelligent safety deposit, comprising a case, a card slot, and an antenna, wherein, the card slot being set inside the case to receive a folder with a tag thereon, and said tag comprising a RFID antenna and a chip, said reader antenna being set correspondingly to the folder, information recorded in said chip with said tag being read and identified separately via transmitting data between said reader antenna and the RFID antenna, characterized in that, said reader antenna comprising a RF connector, RF ground planes, a plurality of antenna traces with unequal widths and a plurality of load impedance, wherein, said RF connector being connected with said plurality of antenna traces via buried holes, said plurality of antenna traces with unequal widths being respectively connected with the plurality of load impedance by running through said buried holes, said antenna traces with unequal widths being connected without overlapping, and value of each load impedance being equal.

2. The intelligent safety deposit according to claim 1, wherein said reader antenna further comprises a power divider being connected between said RF connector and said antenna traces with unequal widths.

3. The intelligent safety deposit according to claim 2, wherein number of said antenna traces set between two ground planes is 2-8, sub-line number is corresponding to the number of said antenna traces.

4. The intelligent safety deposit according to claim 2, wherein radian curve of said antenna is satisfied to quadratic function equation: $Y=ax2+bx+c$, wherein X represents abscissa of the arc and Y is Y-axis thereof, the radian curves of each said antenna traces with unequal widths are equal.

5. The intelligent safety deposit according to claim 4, wherein total length of antenna traces with unequal widths is equal to half a wavelength.

6. The intelligent safety deposit according to claim 5, wherein said RFID antenna is UHF RFID antenna.

7. The intelligent safety deposit according to claim 2, wherein values of said load impedance are set such that total impedance calculated is equal to 50 ohms.

8. The intelligent safety deposit according to claim 1, wherein distance between said RFID antenna and said reader antenna is 1-4 cm, and distance between said reader antennas is not less than 4 cm.

9. A safety control system adopted the intelligent safety deposit of claim 1, wherein the system comprises a central processor, a single-channel reader and a multi-channel reader connected thereto, said single-channel reader is connected with said high-gain directional antenna, and said multi-channel reader is connected with said each reader antenna inside the safety deposit, tag information are obtained by the high-gain directional antenna and the reader antenna and transmitted to the central processor to make decisions via the single-channel reader and the multi-channel reader.

10. A control method adopted the safety control system according to claim 9, wherein the method comprising steps:
Step1) to activate the multi-channel reader and the safe internal reader antenna, and to open sequentially the reader antenna inside the next safety deposit to read the tags of the next folder if a tag corresponding to the information is read;

Step2) to open the high-gain directional antenna if none of tag information is read by the current reader antenna; to activate a first level alarm to prompt that folders haven been stolen if tag information is read by the high-gain directional antenna, simultaneously, the system should be reset to resume scanning tags; to reset the reader antenna to read once again if none of tag information is read by the high-gain directional antenna;

Step3) to activate the alarm deposit to send a second level alarm to prompt that a folder is not placed correctly once the current reader antenna reads tag information that does not correspond; simultaneously, the next reader antenna should be activated to read the tag of the next folder; and Step4) to sequentially and cyclically read each tag information;

wherein, in the steps 3) and 4), the first and second level alarms are independent each other in the whole system scanning process, that is, the alarms could be simultaneously or separately shown.

\* \* \* \* \*